US008457646B2

(12) United States Patent
Kim et al.

(10) Patent No.: US 8,457,646 B2
(45) Date of Patent: Jun. 4, 2013

(54) APPARATUS AND METHOD FOR DYNAMIC RESOURCE EXCHANGE IN COGNITIVE RADIO (CR) BASED COMMUNICATION SYSTEM

(75) Inventors: Ho-Dong Kim, Gwacheon-si (KR); Sang-Bum Kim, Seoul (KR); Eun-Taek Lim, Suwon-si (KR); Ju-Yeon Song, Seoul (KR); Jung-Soo Woo, Suwon-si (KR); Cheng Shan, Suwon-si (KR); Yong-Ho Park, Cheonan-si (KR); Jae-Ik Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 451 days.

(21) Appl. No.: 12/592,822

(22) Filed: Dec. 3, 2009

(65) Prior Publication Data
US 2010/0136974 A1  Jun. 3, 2010

(30) Foreign Application Priority Data
Dec. 3, 2008  (KR) ........................ 10-2008-0121633

(51) Int. Cl.
*H04W 72/00* (2009.01)
(52) U.S. Cl.
USPC ......................................... 455/450; 455/436

(58) Field of Classification Search
USPC ..................... 455/450, 447, 455, 456.2, 452.1
See application file for complete search history.

(56) References Cited

U.S. PATENT DOCUMENTS

| 2008/0090581 A1* | 4/2008 | Hu | .............................. | 455/452.1 |
| 2008/0108366 A1* | 5/2008 | Hu | .............................. | 455/452.1 |
| 2008/0268858 A1* | 10/2008 | Wu et al. | ........................ | 455/448 |

* cited by examiner

*Primary Examiner* — Tu X Nguyen

(57) ABSTRACT

A base station includes an apparatus and a method for exchanging frequency channel resources between base stations in a Cognitive Radio (CR) based communication system. A requesting Base Station (BS), which requests channel exchange a neighboring BS, receives a channel advertisement message from a neighboring BS and sends a channel exchange request message to the neighboring BS. The channel exchange request message includes at least one of a neighbor BS Identifier (ID), a requesting BS ID, channel information for the channel exchange at the requesting BS, and channel information exchangeable at the neighboring BS. The requesting BS receives a channel exchange response message from the neighboring BS in response to the channel exchange request message, determines whether to execute a channel exchange process to the neighboring BS based on information in the received channel exchange response message, and sends a channel exchange reply message indicative of the determination result.

26 Claims, 8 Drawing Sheets

APPARATUS AND METHOD FOR DYNAMIC RESOURCE EXCHANGE IN COGNITIVE RADIO (CR) BASED COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Dec. 3, 2008 and assigned Serial No. 10-2008-0121633, the entire disclosure of which is hereby incorporated by reference.

TECHNICAL FIELD OF THE INVENTION

The present invention relates generally to a Cognitive Radio (CR) based communication system. More particularly, the present invention relates to an apparatus and a method for exchanging frequency channel resources between base stations in a CR system.

BACKGROUND OF THE INVENTION

When a variety of wireless communication systems utilize different spectrums, supporting high-speed multimedia service by allocating a new frequency band is limited because of lack of the frequencies. To address the frequency deficiency, a Cognitive Radio (CR) technique for raising the frequency utilization is drawing attention.

While a Primary User (PU) of the existing frequency license is not using the corresponding band, the CR technique enables a Secondary User (SU) to share the band. It should protect the PUs and ensure quality of service of the SUs (hereafter, referred to as self coexistence). To provide broadband wireless access services over the area ranging from tens of km to 100 km, Institute of Electrical and Electronics Engineers (IEEE) 802.22 standardization for sharing the currently allocated broadcast band based on the CR is under process.

In the CR system with the self coexistence function, a base station detects at least one unused channel of the primary/licensed system and communicates over the detected channel. When a plurality of CR systems spatially coexists, the CR systems exchange a Coexistence Beacon Protocol (CBP) packet to raise the spectrum utilization. To facilitate the self coexistence function, the CR system mostly adopts a superframe structure. For example, the IEEE 802.22 standard defines sixteen (16) frames in the time axis as one superframe.

To handle the coexistence problem in communication systems based on the current CR function, algorithms such as spectrum etiquette, interference-free scheduling, and spectrum contention are suggested. The spectrum etiquette algorithm selects a channel causing little interference or a channel causing the least interference to neighboring base stations. The interference-free scheduling algorithm schedules not to cause the channel interference in the channel resource allocation for the uplink and the downlink. The spectrum contention algorithm makes the base stations occupy the channel through the contention when the channels are insufficient.

In the CR system operation, when the PU appears in the base station and utilizes the channel used by the base station, the base station can no longer use the channel. Therefore, the channels in the base station may be insufficient to degrade the quality of service or give rise to the out-of-service. However, the conventional CR based communication systems cannot suggest more enhanced solutions for the effective utilization of the channel resources between the base stations. In this respect, research is sought.

SUMMARY OF THE INVENTION

To address the above-discussed deficiencies of the prior art, it is a primary aspect of the present invention is to address at least the above mentioned problems and/or disadvantages and to provide at least the advantages described below. Accordingly, an aspect of the present invention is to provide an apparatus and a method for, when a channel is already allocated to a Cognitive radio (CR) based base station and a Primary User (PU) appears in the base station, overcoming discontinuous service because the base station cannot use the channel.

Another aspect of the present invention is to provide an apparatus and a method for dynamic channel exchange between a base station and a neighboring base station to address a problem in system operation caused by the lack of the channels when a channel operated by the base station is not used because of appearance of a PU.

Yet another aspect of the present invention is to provide an apparatus and a method for dynamic channel exchange between a target base station and a neighboring base station, which may shorten a service delay time caused in the lack of the channels and mitigate interference of a PU by efficiently exchanging channel resources between CR based base stations.

According to one aspect of the present invention, a channel exchange method of a requesting Base Station (BS) which requests a neighboring BS to exchange a channel in a CR based communication system includes receiving a channel advertisement message from a neighboring BS; sending a channel exchange request message to the neighboring BS, the channel exchange request message including at least one of a neighbor BS Identifier (ID), a requesting BS ID, channel information for the channel exchange at the requesting BS, and channel information exchangeable at the neighboring BS; receiving a channel exchange response message from the neighboring BS in response to the channel exchange request message; and determining whether to execute a channel exchange process to the neighboring BS based on information in the received channel exchange response message, and sending a channel exchange reply message indicative of the determination result.

According to another aspect of the present invention, a channel exchange method of a channel exchange accepting BS which receives a channel exchange request from a neighboring BS in a CR based communication system includes sending a channel advertisement message to a neighboring BS; receiving a channel exchange request message from the neighboring BS; sending a channel exchange response message to the neighboring BS in response to the channel exchange request message, the channel exchange response message comprising at least one of the neighboring BS ID, an ID of the channel exchange accepting BS, channel information for the channel exchange, and exchange target channel information of the neighboring BS; and receiving a channel exchange reply message indicative of whether the neighboring BS executes a channel exchange process according to the channel exchange response message, from the neighboring BS.

According to yet another aspect of the present invention, a requesting BS which requests a neighboring BS to exchange a channel in a CR based communication system includes a receiver configured to receive a channel advertisement message from a neighboring BS and receive a channel exchange response message from the neighboring BS in response to a channel exchange request message sent to the neighboring BS; and a transmitter configured to send the channel exchange request message to the neighboring BS, determine whether to execute a channel exchange process to the neighboring BS based on information in the channel exchange response message received from the neighboring BS, and send a channel exchange reply message indicative of the determination result. The channel exchange request message includes at least one of a neighbor BS ID, an ID of the requesting BS, channel information for the channel exchange at the requesting BS, and channel information exchangeable at the neighboring BS.

According to still another aspect of the present invention, a channel exchange accepting BS which receives a channel exchange request from a neighboring BS in a CR based communication system includes a transmitter configured to send a channel advertisement message to a neighboring BS and sending a channel exchange response message to the neighboring BS in response to a channel exchange request message received from the neighboring BS; and a receiver configured to receive the channel exchange request message from the neighboring BS and receive a channel exchange reply message indicative of whether the neighboring BS receive the channel exchange response message executes a channel exchange process, from the neighboring BS. The channel exchange response message includes at least one of the neighboring BS ID, an ID of the channel exchange accepting BS, channel information for the channel exchange, and exchange target channel information of the neighboring BS.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

Exemplary embodiments of the present invention provide an apparatus and a method for dynamically exchanging resources in a Cognitive Radio (CR) based communication system. Herein, a Wireless Regional Area Network (WRAN) system, which is one of the CR based communication systems, will be illustrated by way of example to explain the CR based communication system. Alternatively, the CR based system may be applied to a relatively small area such as Wireless Local Area Network (WLAN).

Each Base Station (BS) includes a transmitter and a receiver. The BS sends a message to a neighboring BS through the transmitter and receives a message from a neighboring BS through the receiver.

Table 1 classifies channels allocated to a WRAN BS into three channel sets. $F_{active\ set}$ (active set: active channel set) is a set of channels used by the BS, and $F_{inactive\ set}$ (inactive set:

inactive channel set) is a set of channels held by the BS but unusable because of appearance of a Primary User (PU) having the corresponding frequency license. $F_{candidate\ set}$ (candidate set: candidate channel set) is a set of channels reserved for a situation where the channel set $F_{active\ set}$ currently used by the BS is unavailable. As shown in Table 1, each BS may define the channel sets by classifying its allocated channels based on the channel usage using spectrum etiquette or other processes.

TABLE 1

|  | WRAN BS1 | WRAN BS2 | WRAN BS3 | ... |
|---|---|---|---|---|
| $F_{active\ set}$ | 1 | 2 | 3 | |
| $F_{candidate\ set}$ | 4, 5 | 6, 7 | 8, 9 | |
| $F_{inactive\ set}$ | 2 | 3 | 1 | |

Figure 1:
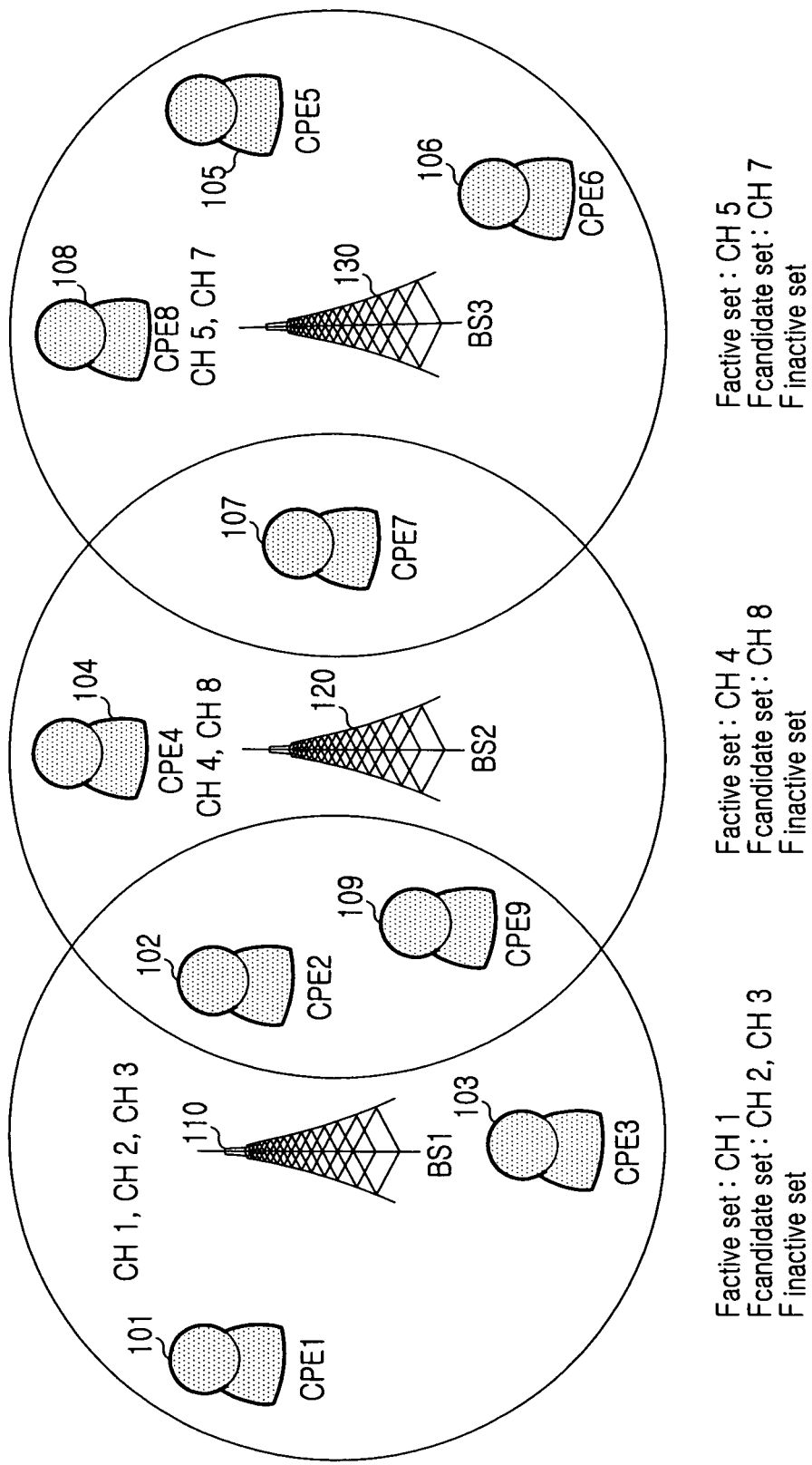
FIG. 1 illustrates channel conditions of base stations in a Cognitive Radio (CR) based communication system according to an exemplary embodiment of the present invention.

FIG. 1 illustrates channel conditions of BSs in the CR based communication system according to an exemplary embodiment of the present invention.

There are three BSs including BS1 110, BS2 120, and BS3 130. Under the BSs 110, 120 and 130, resides a plurality of Customer Premise Equipment (CPE) 101 through 109. Channels already are allocated to the BSs 110, 120 and 130. Channel (CH)1, CH2 and CH3 are allocated to the BS1 110; CH4 and CH8 are allocated to the BS2 120; and CH5 and CH7 are allocated to the BS3 130. The channel sets $F_{active\ set}$, $F_{candidate\ set}$, and $F_{inactive\ set}$ of the BSs 110, 120 and 130 classified in Table 1 are shown in FIG. 1.

Figure 2:
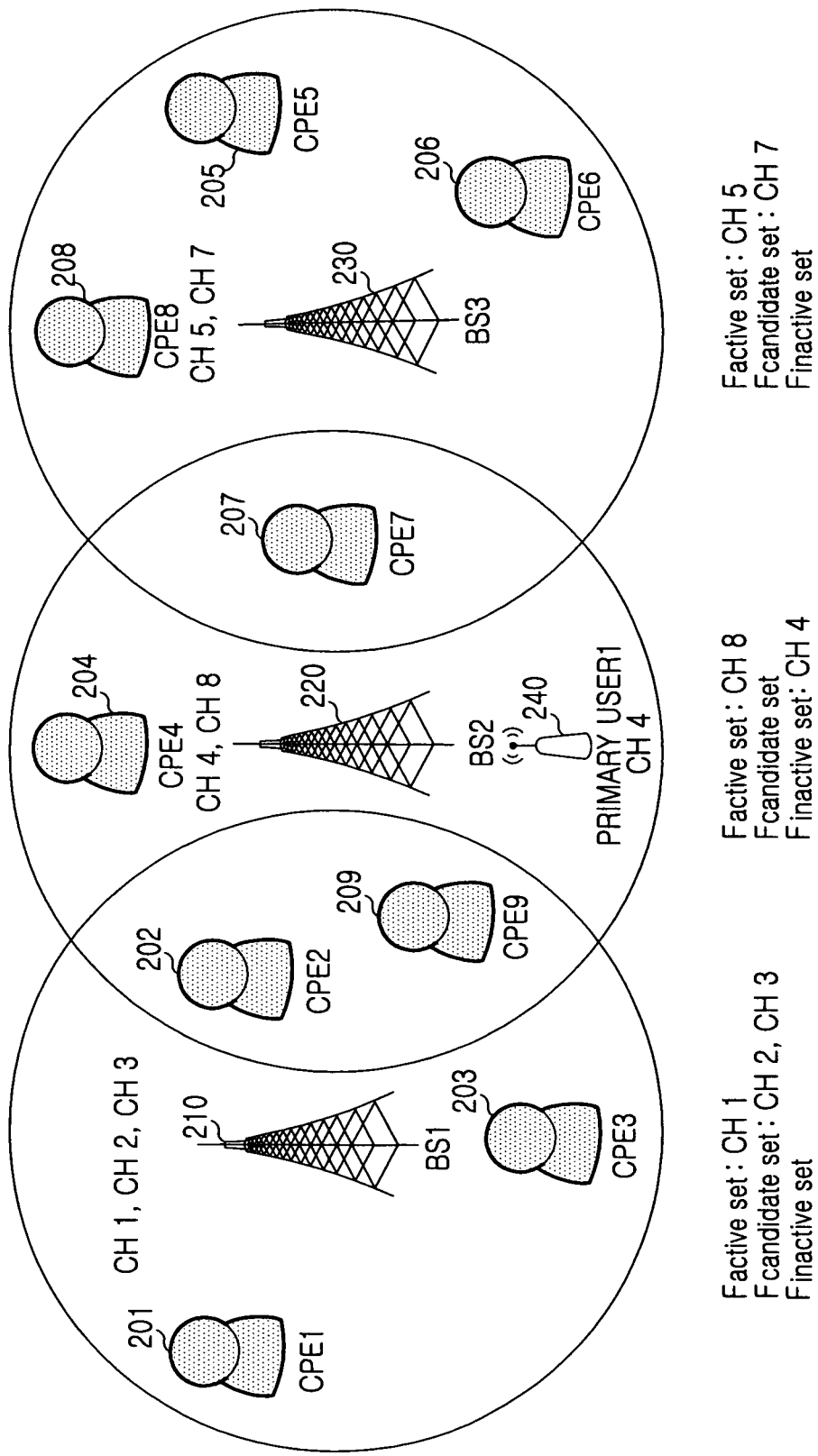
FIG. 2 illustrates appearance of a Primary User (PU) using a channel 4 in a Base Station (BS)2 according to an exemplary embodiment of the present invention.

FIG. 2 illustrates appearance of the PU who uses the CH4 in the BS2 according to an exemplary embodiment of the present invention.

It is assumed that the channels are set based on the embodiment of FIG. 1. That is, it is assumed that the BS2 220 is using the CH4 and the CH8, $F_{active\ set}$ of the BS2 220 includes the CH4, and $F_{candidate\ set}$ includes the CH8. When the PU 240 interfered by signals of the BS2 220 intends to use the CH4 or uses the CH4, as the PU 240 appears, the BS2 220 cannot use the CH4 belonging to $F_{active\ set}$ because of the channel interference. In this situation, the BS2 220 maintains the current service by changing the active channel set; that is, by moving the CH4 of $F_{active\ set}$ to $F_{inactive\ set}$ and moving the CH8 of $F_{candidate\ set}$ to $F_{active\ set}$. However, when not able to use the changed CH8 of $F_{active\ set}$ either, the system performance may be degraded or the service may be suspended because no channels exist in $F_{candidate\ set}$ of the BS2 220. To prevent this, the BS2 220 needs to ensure additional available channel.

Figure 3:
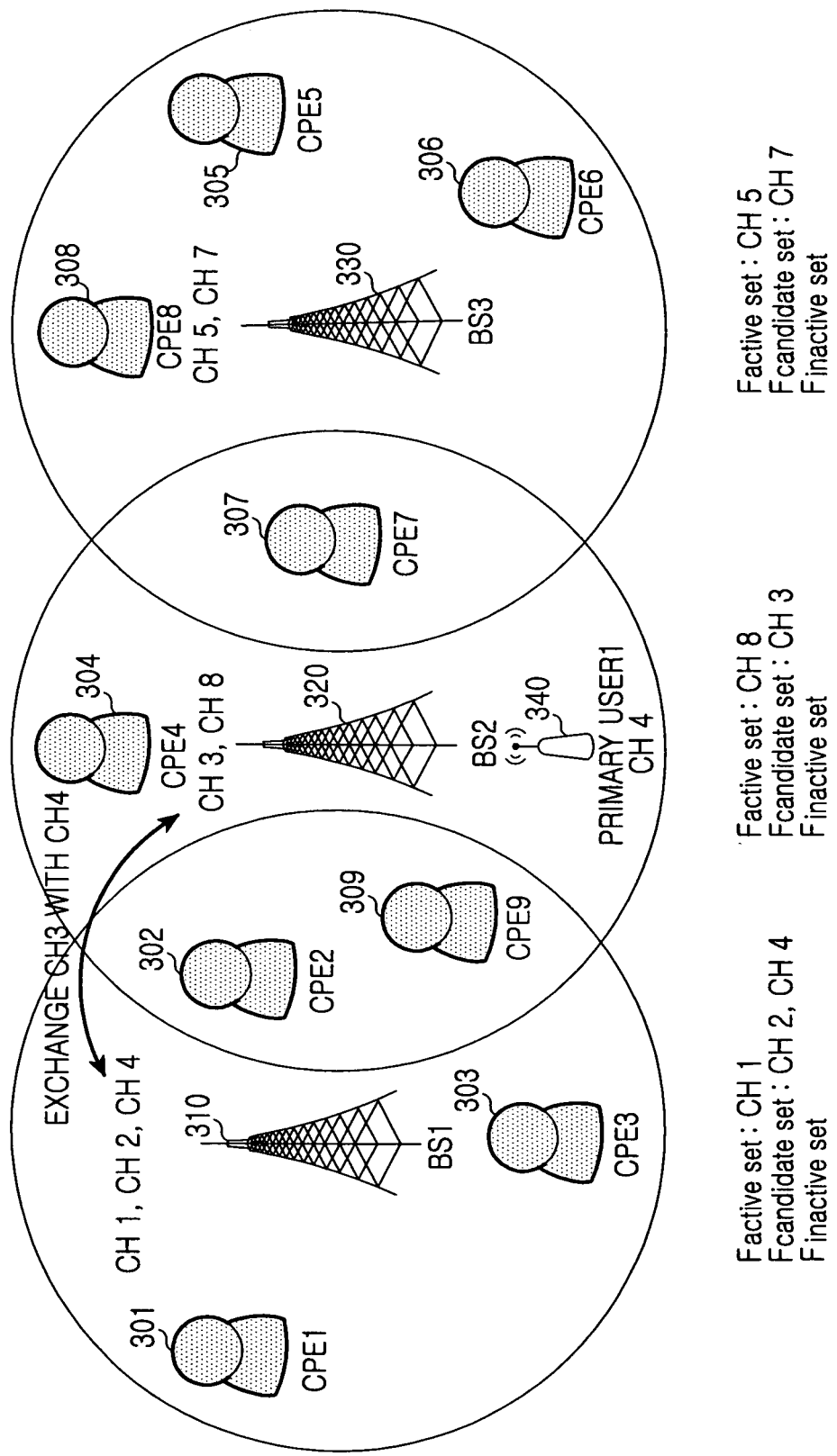
FIG. 3 illustrates one-to-one exchange of the channel 3 of the BS1 with the channel 4 of the BS2 according to an exemplary embodiment of the present invention.

FIG. 3 illustrates one-to-one exchange of the CH3 of the BS1 with the CH4 of the BS2 according to an exemplary embodiment of the present invention.

For the channel exchange, the example of FIG. 3 exchanges the CH3 belonging to $F_{candidate\ set}$ of the BS1 310 with the CH4 belonging to $F_{inactive\ set}$ of the BS2 320 in the one-to-one correspondence. As mentioned in FIG. 2, since the CH4 belongs to $F_{inactive\ set}$, the BS2 320 attempts the channel exchange with the neighboring BSs 310 and 330 to search a channel for $F_{candidate\ set}$. More specifically, the BS2 320 sends information relating to the CH4 belonging to $F_{inactive\ set}$ to the BS1 310 and the BS3 330 as the exchange information. The BS1 310 sends information relating to the CH2 and the CH3 belonging to $F_{candidate\ set}$ to the BS2 320 and permits the channel exchange process. The BS2 320 gives the CH4 to the BS1 310 in substitute for the CH3 determined as its suitable channel among the CH2 and the CH3 and thus completes the channel exchange process. Therefore, the CH4 is newly added to $F_{candidate\ set}$ of the BS1 310 and the CH3 is newly added to $F_{candidate\ set}$ the BS2 320. By virtue of this one-to-one channel exchange process, the BS2 320 may reject the channel interference and enhance the system performance.

Figure 4:
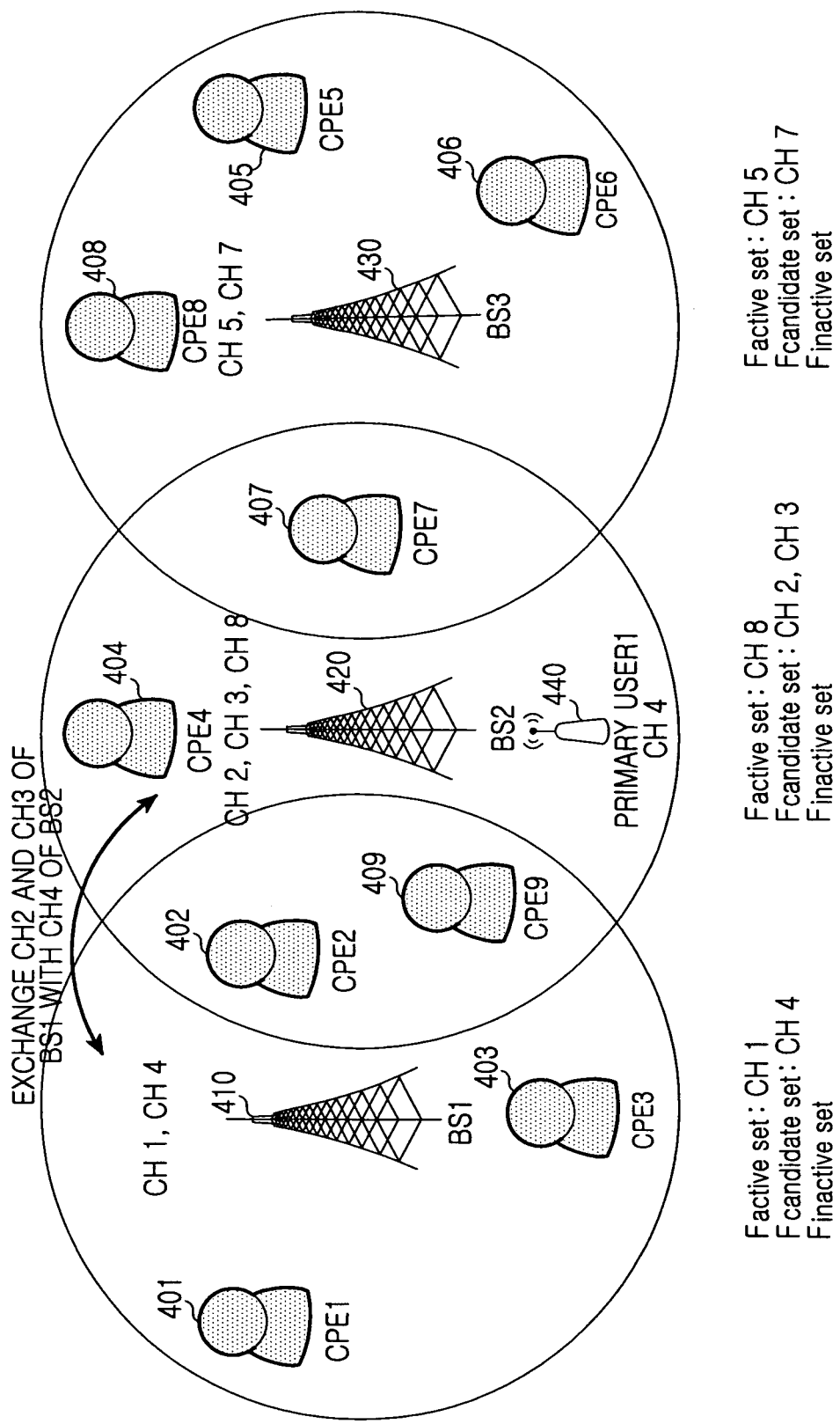
FIG. 4 illustrates many-to-one exchange of channel 2 and channel 3 of the BS1 with the channel 4 of the BS2 according to an exemplary embodiment of the present invention.

FIG. 4 illustrates many-to-one exchange of the CH2 and the CH3 of the BS1 with the CH4 of the BS2 according to an exemplary embodiment of the present invention.

The scenario of FIG. 4 exchanges the CH2 and the CH3 belonging to $F_{candidate\ set}$ of the BS1 410 with the CH4 belonging to $F_{inactive\ set}$ of the BS2 420 in the many-to-one correspondence through the channel exchange process. As mentioned in FIG. 2, since the CH4 belongs to the unavailable $F_{inactive\ set}$, the BS2 420 attempts the channel exchange with the neighboring BSs 410 and 430. Besides the CH4, the BS2 420 may require an additional channel in response to the frequent appearance of the PU 440 or to meet the traffic demand. In this case, the BS2 420 sends information relating to the CH4 belonging to $F_{inactive\ set}$ to the BS1 410 and the BS3 430 as the exchange information, together with the additional channel exchange information. The BS1 410 sends information relating to the CH2 and the CH3 belonging to $F_{candidate\ set}$ to the BS2 420 and thus permits the channel exchange process. The BS2 420 gives the CH4 to the BS1 410 in substitute for the CH2 and the CH3 and thus completes the channel exchange process. By virtue of the many-to-one channel exchange process, the BS2 420 may avoid the channel interference and satisfy the traffic demand.

Figure 5:
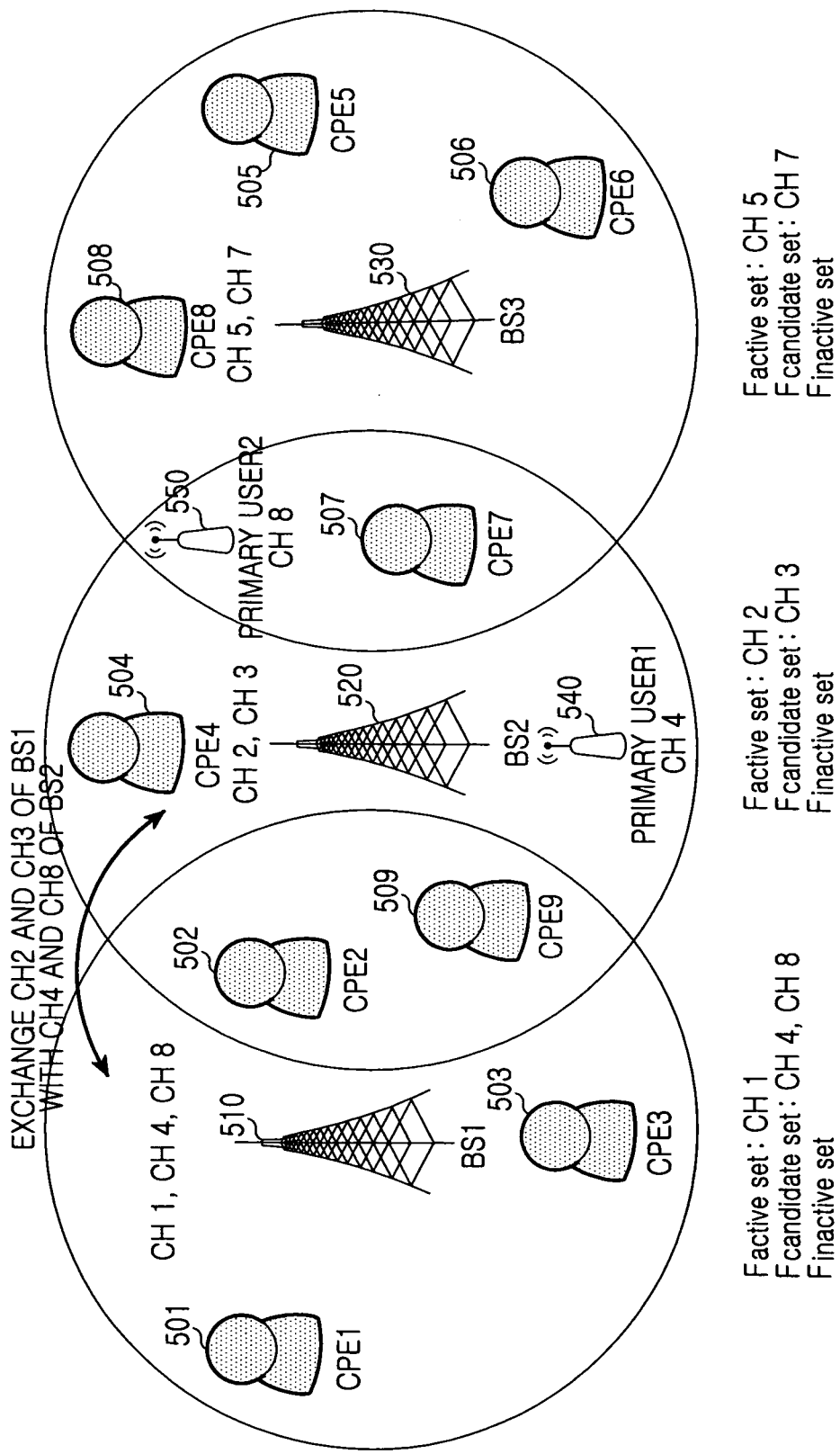
FIG. 5 illustrates many-to-many exchange of channel 1 and channel 3 of the BS1 with the channel 4 and the channel 8 of the BS2 according to an exemplary embodiment of the present invention.

FIG. 5 illustrates many-to-many exchange of the CH1 and the CH3 of the BS1 with the CH4 and the CH8 of the BS2 according to an exemplary embodiment of the present invention.

When the channels are set based on the embodiment of FIG. 1, the PU1 540 interfered by signals of the BS2 520 intends to use the CH4 and the PU2 550 intends to use the CH8 or they use the corresponding channels. As the PU1 540 and the PU2 550 appear, the BS2 520 may use neither the CH4 nor the CH8 currently occupied and thus suffer from the service interruption. In this situation, the BS2 520 sets the currently occupied CH4 and CH8 to $F_{inactive\ set}$ and sends information, relating to the CH4 and the CH8 belonging to $F_{inactive\ set}$ to the BS1 510 and the BS3 530, as the exchange information together with information which requests additional exchange of two or more channels. The BS1 510 permits the channel exchange process by sending information relating to the CH2 and the CH3 belonging to $F_{candidate\ set}$ to the BS2 520. The BS2 520 gives the CH4 and the CH8 belonging to $F_{inactive\ set}$ in exchange for the CH2 and the CH3 belonging to $F_{candidate\ set}$ of the BS1 510 and thus completes the channel exchange process. By virtue of the many-to-many channel exchange process, the lack of the channels of the BS2 520 may be addressed.

Figure 6:
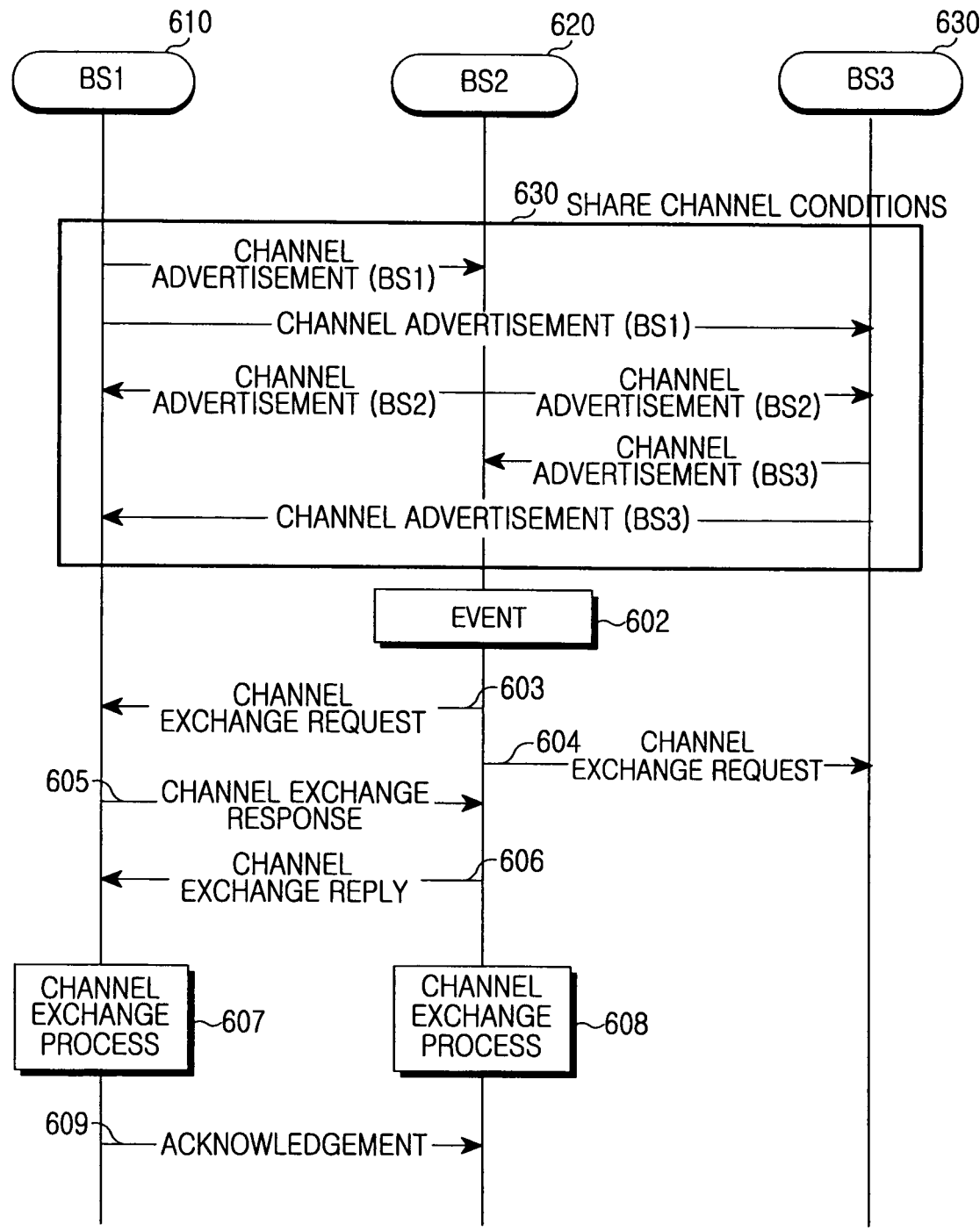
FIG. 6 illustrates a dynamic resource exchange process in the CR based communication system according to an exemplary embodiment of the present invention.

FIG. 6 illustrates a dynamic resource exchange process in the CR based communication system according to an exemplary embodiment of the present invention.

Three BS1 610, BS2 620 and BS3 630 share the channel conditions using channel advertisement messages in step 601. Information shared through the channel advertisement messages includes $F_{active\ set}$, $F_{candidate\ set}$, and $F_{inactive\ set}$ of each BS. The channel advertisement message is transmitted periodically or on demand. The BSs 610, 620 and 630 acquires $F_{candidate\ set}$ and $F_{inactive\ set}$ information of the neighboring BSs, which may be the channel exchange candidates, using the channel advertisement message in advance.

Detecting the appearance of the PU in step 602, the BS2 620 determines whether the channel to be used or being used by the detected PU is identical to the channel used by the BS2 620. When the channels are identical, the BS2 620 sends a channel exchange request message to the neighboring BS1

610 and BS3 630 in steps 603 and 604. The channel exchange request message includes information such as the BS Identifier (ID) that wants the channel exchange, BS ID of the neighboring BS to which the channel exchange is requested, the number of channels to exchange, and the channel number (or index).

Receiving the channel exchange request message, the BS1 610 determines whether the channel exchange is possible and sends a channel exchange response message to the BS2 620 in step 605. The channel exchange response message includes information such as the BS ID that wants the channel exchange, BS ID of the neighboring BS to which the channel exchange is requested, the number of channels to exchange, and the channel number.

The BS2 620, receiving the channel exchange response message, sends a channel exchange reply message to the BS1 610 in step 606. The channel exchange reply message is used to finally examine whether the BS desiring the channel exchange performs the channel exchange with the neighboring BS. The channel exchange reply message includes information such as the BS ID that wants the channel exchange, BS ID of the neighboring BS to which the channel exchange is requested, and a flag. The flag is an indicator of value '0' or '1'. For example, the value '0' implies no channel exchange with the BS that wants the channel exchange. Additionally, the value '1' implies the channel exchange with the BS that wants the channel exchange.

The BS1 610 and the BS2 620 carry out the channel exchange process in steps 607 and 608. The channel exchange process includes determining which channel needs to be exchanged at each BS, based on the information acquired by sending and receiving the channel exchange request message and the channel exchange response message. The channel exchange process includes classifying the determined exchanged channel to the channel set (such as, candidate channel set or active channel set) managed by the BS, or applying as the operating channel.

After the channel exchange process is finished, the BS1 610 sends a channel acknowledgement message to the BS2 620 in step 609, thus completing the entire process. The channel acknowledgement message includes the BS ID that wants the channel exchange and information indicative of the channel exchange process success or failure (or a code mapped to the corresponding information).

Now, the messages shown in FIG. 6 and their corresponding processes are explained in further detail.

Table 2 shows the channel advertisement message format. The channel advertisement message informs the neighboring BS of the information and the status (that is, $F_{active\ set}$, $F_{candidate\ set}$, $F_{inactive\ set}$) of the channels held by the BS. That is, the channel advertisement message includes the BS ID that sends the corresponding channel advertisement message, the number of channels held by the BS, and the held channel number (or index). The channel advertisement message also includes the number of channels currently used by the BS and the channel information list (that is, the channel number in the active channel set $F_{active\ set}$) currently used by the BS. The channel advertisement message includes the number of channels reserved for the case where the BS may not use the channels of the active channel set $F_{active\ set}$, and the channel information list (that is, the channel number in the candidate channel set $F_{candidate\ set}$) reserved for the case where the channels of the active channel set are unavailable. The channel advertisement message includes the number of the channels unusable because of the appearance of the PU or other reasons, and the corresponding channel information list (that is, the channel number in the inactive channel set $F_{inactive\ set}$).

TABLE 2

| Syntax | Notes |
|---|---|
| BS ID | BS ID |
| Number of Channels for Holding | Number of channels held by BS |
| For (i=0;i<Number of Channels for Holding;i++) { <br> Channel Number for Holding[i] <br> } | Channel information list held by BS |
| Number of Channels for Active Set | Number of channels currently used by BS |
| For (i=0;i<Number of Channels for Active Set;i++) { <br> Channel Number for Active Set [i] <br> } | Channel information list currently used by BS |
| Number of Channels for Candidate Set | Number of channels reserved for case where BS cannot use channels of active set |
| For (i=0;i<Number of Channels for Candidate Set;i++) { <br> Channel Number for Candidate Set [i] <br> } | Channel information list reserved for case where BS cannot use channels of active set |
| Number of Channels for Inactive Set | Number of channels unusable because of appearance of PU |
| For (i=0;i<Number of Channels for Inactive Set;i++) { <br> Channel Number for Inactive Set [i] <br> } | Channel information list unusable because of appearance of PU |

Table 3 shows the channel exchange request message format. When $F_{candidate\ set}$ reserved for no channels in $F_{active\ set}$ currently used, or for some other cases lacks the channels, the BS sends the channel exchange request message including the number of channels to exchange and the corresponding channel information, and the number of channels to receive and the corresponding channel information, to the neighboring BS based on the channel advertisement message. The channel exchange request message is designed to carry different information according to the ID of the neighboring BS. More specifically, the channel exchange request message includes the BS ID that sends the corresponding channel exchange request message (or that wants the channel exchange), the BS ID of the neighboring BS to which the channel exchange is requested, the number of channels to exchange because the BS wanting the channel exchange cannot use them, and the channel information list of the unusable channels to be exchanged. The channel exchange request message includes the number of candidate channels exchangeable at the neighboring BS to which the channel exchange is requested, and the corresponding channel information list.

TABLE 3

| Syntax | Note |
|---|---|
| Source BS ID | ID of BS which wants channel exchange |
| Destination BS ID | Neighboring BS ID of source BS ID |
| Number of Channels for Exchanging | Number of channels to exchange because BS wanting the channel exchange cannot use them |
| For(i=0;i<Number of Channels for Exchanging;i++) { | Channel information list for channel exchange because BS wanting the channel exchange cannot use them |

TABLE 3-continued

| Syntax | Note |
| --- | --- |
| Channel Number for Exchanging[i]<br>} | |
| Number of Channels for<br>Exchanging Candidate | Number of candidate channels<br>exchangeable at neighboring BS |
| For(i=0;i<Number of Channels for<br>Exchanging Candidate;i++) { | Candidate channel information<br>list for channel exchange at<br>neighboring BS |
| Channel Number for Exchanging<br>Candidate[i]<br>} | |

Table 4 shows the channel exchange response message format. Upon receiving the channel exchange request message from the BS that requests the channel exchange, the neighboring BS may select a channel from its $F_{inactive\ set}$ or $F_{candidate\ set}$ and sends the channel exchange response message, including the channel exchange information, to the BS that requests the channel exchange. More particularly, the channel exchange response message includes the BS ID that sends the channel exchange response message (or which intends to exchange the channel), and the destination BS ID to receive the channel exchange response message (or the BS that sends the channel exchange request message or the BS that wants the channel exchange). The channel exchange response message includes the number of channels to exchange at the BS that intends to exchange the channel, and the corresponding channel information list. The channel exchange response message includes the number of channels for exchanging at the BS that wants to exchange the channel and the corresponding channel information list. As such, using the channel exchange request message and the channel exchange response message, the BSs sending and receiving the corresponding messages obtain the channel information to exchange.

TABLE 4

| Syntax | Note |
| --- | --- |
| Source BS ID | BS ID which intends to exchange channel |
| Destination BS ID | BS ID wanting the channel exchange |
| Number of Channels for Exchanging Target Exchanging | Number of channels to exchange at BS intending to exchange channel |
| For(i=0;i<Number of Channels for Exchanging Target;i++) { | Channel information list to exchange at BS intending to exchange channel |
| Channel Number for Exchanging Target[i]<br>} | |
| Number of Channels for Exchanging Substitution | Number of channel to exchange at BS wanting the channel exchange |
| For(i=0;i<Number of Channels for Exchanging Substitution;i++) { | Channel information list for exchanging at BS wanting the channel exchange |
| Channel Number for Exchanging Substitution[i]<br>} | |

Table 5 shows the channel exchange reply message format. The channel exchange reply message is used for the BS that wants the channel exchange to determine whether to proceed with the channel exchange process to the corresponding neighboring BS that enables the channel exchange and sends the channel exchange response message. The channel exchange reply message includes the flag that is the indicator of the value '0' or '1'. For example, the value '0' implies no channel exchange with the BS that wants the channel exchange (or the BS that requested the channel exchange) and the value '1' implies the channel exchange with the BS that wants the channel exchange. In other words, the channel exchange reply message includes the BS ID that wants the channel exchange (or that requested the channel exchange), the BS ID of the BS that sends the channel exchange response message (or the neighboring BS responding to the channel exchange), and the flag. In various embodiments, since the channel exchange reply message determines whether to proceed to the next procedure, sending and receiving the channel exchange reply messages is omitted.

TABLE 5

| Syntax | Note |
| --- | --- |
| Source BS ID | BS ID requesting the channel exchange |
| Destination BS ID | Neighboring BS ID responding to channel exchange |
| Flag | 0: no channel exchange process<br>1: channel exchange process |

Table 6 shows the channel acknowledgement message format. The BS that accepted the channel exchange sends the channel acknowledgement message, including the information of the channel exchange fails or successes after the channel change process, and if failed, the failure reason, to the BS that wants the channel exchange (or to the BS which sends the channel exchange request message). That is, the channel acknowledgement message includes the BS ID of the BS sending the channel acknowledgement message (or the BS responding to the channel exchange), the BS ID of the BS requesting the channel exchange (the neighboring BS wanting the channel exchange), and the channel exchange success and failure information. The channel exchange success and failure information may selectively represent information corresponding to the success or failure reasons by mapping to codes or particular values as shown in Table 6.

TABLE 6

| Syntax | Note |
| --- | --- |
| Source BS ID | BS ID responding to the channel exchange |
| Destination BS ID | Neighboring BS ID wanting the channel exchange |
| Code Message (CM) | Message from the source BS to the destination BS<br>Code message includes channel exchange success/failure information, and may include information of failure reason.<br>0: channel exchange success<br>1: channel exchange failure/channel collision<br>2: channel exchange failure/system error<br>3: channel exchange failure/exchange some of agreed channels<br>4: channel exchange failure/unknown reason<br>. . . |

Table 7 illustrates a channel storage structure for the channel exchange process. It is assumed that each individual BS includes two channel lists. The first channel list arranges the channels belonging to $F_{inactive\ set}$ unusable at the BS, and the second channel list stores the channels allowed for the exchanging through the channel exchange response message from the neighboring BS. The corresponding BS deletes the channel that causes the channel interference to the PU based on the information acquired by sending and receiving the channel advertisement message and the channel exchange response message of the neighboring BS, and sorts the channels based on the criterion such as channel status priority. Herein, in the first channel list, the high channel priority implies that the channel condition of the corresponding BS is relatively worse than the other channels. In the second channel list, the high channel priority indicates the channel that may attain more gain or the better channel than the other channels, through the channel exchange with the other BS at the corresponding BS.

TABLE 7

| BS ID |
|---|
| 1 |
| 2 |
| 3 |
| 4 |
| ... |
| M |
| 1 |
| 2 |
| 3 |
| 4 |
| ... |
| N |

Figure 7:
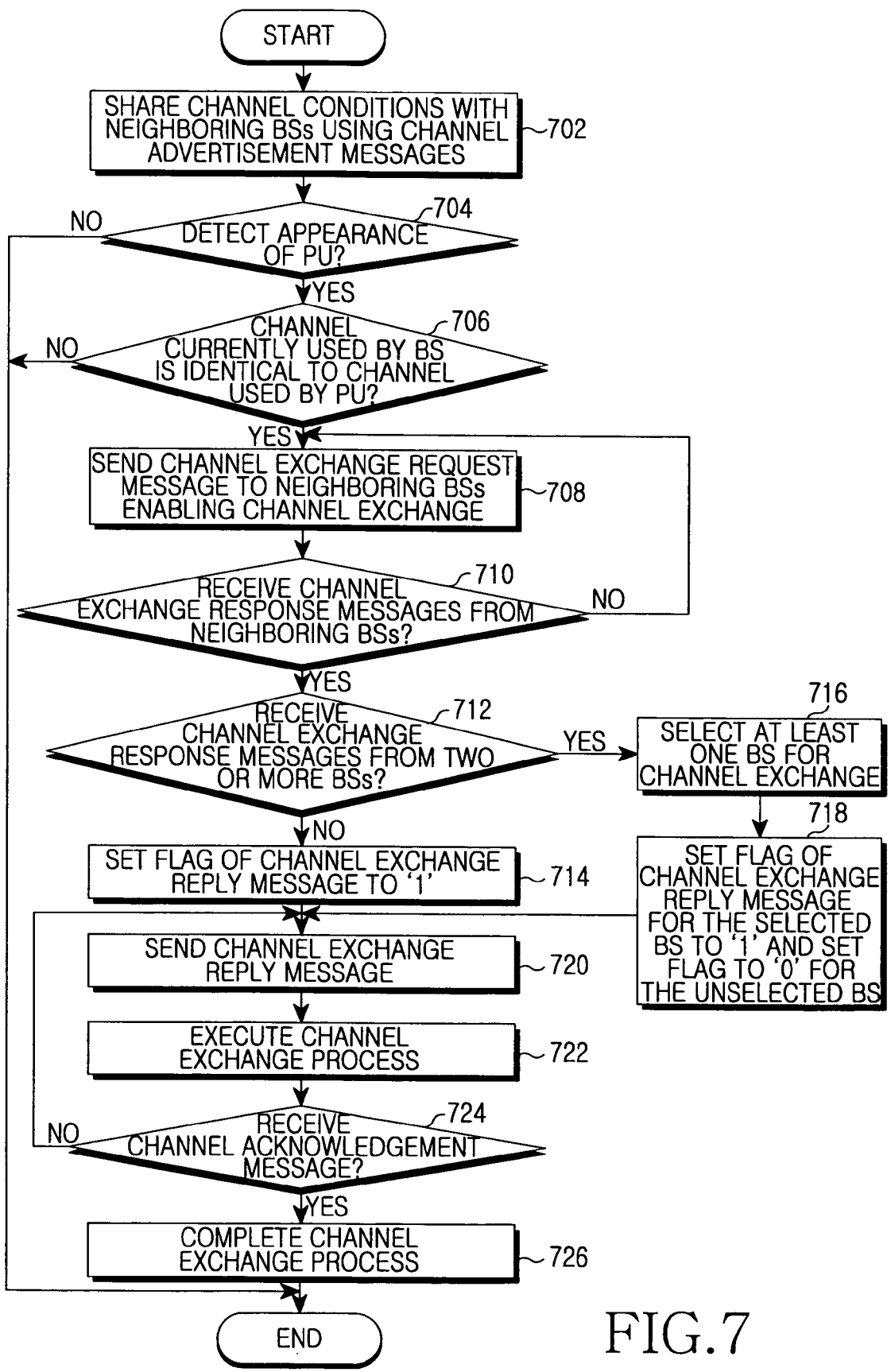
FIG. 7 illustrates a dynamic resource exchange method of the BS which requests the CR based channel exchange according to an exemplary embodiment of the present invention.

FIG. 7 illustrates a dynamic resource exchange method of the BS that requests the CR based channel exchange according to an exemplary embodiment of the present invention.

When the PU appears and intends to use or uses the channel used by the BS, the interference may occur or the traffic demand may not be satisfied. In this respect, the BS proceeds with the dynamic resource exchange method of the present invention.

As mentioned above, the BS wanting the channel exchange shares the channel conditions with the neighboring BSs in step 702. That is, the BS sends or receives the channel advertisement message. In step 704, the BS determines whether the appearance of the PU is detected or not. Detecting no appearance of the PU, the BS finishes this process.

Alternatively, upon detecting the appearance of the PU, the BS determines whether the channel currently used by the BS is identical to the channel used by the PU by determining the channel used by the PU in step 706. When the channels are different, the BS finishes this process.

When the channels are identical, the BS proceeds with the dynamic resource exchange process. More specifically, the BS sends the channel exchange request message to the neighboring BSs enabling the channel exchange in step 708 and determines whether the channel exchange response messages are received from the neighboring BSs in step 710. When receiving no channel exchange response messages, the BS returns to step 708 and repeats the subsequent steps.

Upon receiving the channel exchange response messages, the BS determines whether the channel exchange response messages are received from two or more neighboring BSs in step 712.

When receiving the channel exchange response message from one neighboring BS in step 712, the BS determines whether to conduct the channel exchange process to the one neighboring BS based on the information of the received channel exchange response message and includes the information according to determination to the channel exchange reply message in step 714. In step 720, the BS sends the channel exchange reply message to the one neighboring BS. Herein, as determining to conduct the channel exchange process, the BS sets the flag of the channel exchange reply message to '1' in step 714.

When receiving the channel exchange response messages from two or more neighboring BSs in step 712, the BS selects at least one neighboring BS for the channel exchange in step 716. In step 718, the BS sets the value indicative of the channel exchange process, for example, '1', in the flag of the channel exchange reply message to send to the selected at least one neighboring BS, and sets the value indicative of no channel exchange process, such as, '0', in the flag of the channel exchange reply message to send to the unselected neighboring BS. In step 720, the BS sends the channel exchange reply message to the two or more neighboring BSs. Herein, in various exemplary embodiments, the BS may not send the channel exchange reply message to the unselected neighboring BS.

Next, the BS executes the channel exchange process in step 722 and determines whether the channel acknowledgement message is received in step 724. When not receiving the channel acknowledgement message after waiting for the channel acknowledgement message over a certain time, the BS may go back to step 720 and re-send the channel exchange reply message. Herein, the channel exchange process execution, after the channel exchange reply message is retransmitted, may be omitted when it has been carried out before. Alternatively, when receiving the channel acknowledgement message within the certain time, the BS completes the channel exchange process in step 726 and finishes this process.

Figure 8:
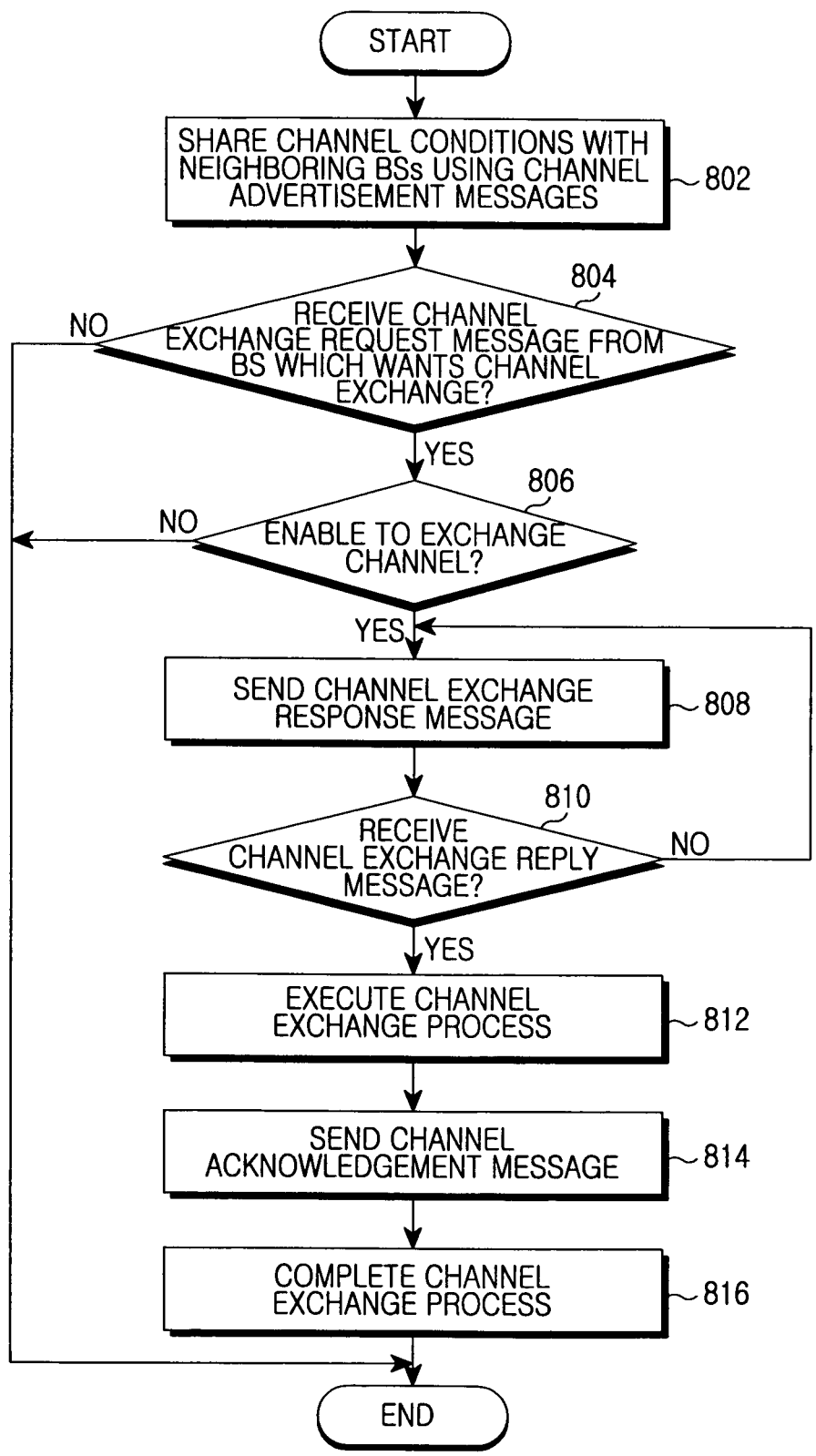
FIG. 8 illustrates a dynamic resource exchange method of a neighboring BS which accepts the CR based channel exchange according to an exemplary embodiment of the present invention.

FIG. 8 illustrates a dynamic resource exchange method of the neighboring BS that accepts the CR based channel exchange according to an exemplary embodiment of the present invention. Namely, FIG. 8 illustrates the operations of the BS that receives the channel exchange request message and accepts the channel exchange.

In step 802, the BS shares the channel information and conditions with the neighboring BSs by sending and receiving the channel advertisement message as in FIG. 6.

In step 804, the BS determines whether the channel exchange request message is received from the BS that wants the channel exchange. When not receiving the channel exchange request message, the BS terminates this process.

Alternatively, when receiving the channel exchange request message, the BS determines whether it may change the channel in step 806. When the channel exchange is impossible, the BS terminates this process. When the channel exchange is possible, the BS sends the channel exchange response message to the BS that wants the channel exchange in step 808. When sending the channel exchange response message, the BS activates a timer. In step 810, the BS determines whether the channel exchange reply message is received within a certain time through the timer. If the BS does not receive the channel exchange reply message within the certain time, the BS determines that the BS wanting the channel exchange failed to receive the channel exchange response message, or that the BS itself failed to receive the channel exchange reply message; and thus goes back to step 808 to resend the channel exchange response message.

In response to receiving the channel exchange reply message within the certain time, the BS conducts the channel exchange process according to the channel information of the BS wanting the channel exchange in step 812 and sends the channel acknowledgement message to the BS wanting the channel exchange in step 814. Next, the BS completes the channel exchange process in step 816 and then finishes this process.

As set forth above, when the target BS lacks the channel to use because of the appearance of the PU in the CR based communication system, the channel utilization may be increased by exchanging the channel with the neighboring BS. Further, the network performance may be enhanced by shortening the channel exchange time and minimizing the interference of the PU.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A channel exchange method of a requesting Base Station (BS) that requests a neighboring BS to exchange a channel in a Cognitive Radio (CR) based communication system, the method comprising:
   receiving a channel advertisement message from a neighboring BS;
   defining an active set of channels and a candidate set of channels, wherein the active set of channels comprises one or more channels actively used by the requesting BS and the candidate set of channels comprises one or more channels reserved for use by the requesting BS when one of the channels in the active set becomes unavailable;
   detecting a primary user in the requesting BS, wherein the primary user is using a first channel;
   when the first channel is in the active set of channels, initiating an exchange of the first channel for a second channel with the neighboring BS by sending a channel exchange request message to the neighboring BS, the channel exchange request message comprising at least one of a neighbor BS Identifier (ED), a requesting BS ID, channel information for the channel exchange at the requesting BS, and channel information exchangeable at the neighboring BS;
   receiving a channel exchange response message from the neighboring BS in response to the channel exchange request message; and
   determining whether to execute a channel exchange process to the neighboring BS based on information in the received channel exchange response message, and sending a channel exchange reply message indicative of the determination result, wherein the channel exchange process comprises moving the first channel from the active set to an inactive set of channels for the requesting BS, switching a third channel from the candidate set to the active set, and adding the second channel to the candidate set.

2. The channel exchange method of claim 1, wherein the channel advertisement message comprises information relating to at least one of an active set for the neighboring BS, a candidate set for the neighboring BS, and an inactive set for the neighboring BS.

3. The channel exchange method of claim 1, wherein the channel exchange response message comprises at least one of the neighboring BS ID, the requesting BS ID, channel information to exchange at the neighboring BS, and channel information to exchange at the requesting BS.

4. The channel exchange method of claim 1, further comprising:
   after sending the channel exchange reply message, receiving a channel acknowledgement message which comprises information relating to success or failure of the channel exchange process, from the neighboring BS.

5. The channel exchange method of claim 1, wherein channel exchange process comprises at least one of determining a channel to exchange at the neighboring BS, classifying the channel to exchange at the neighboring BS to a candidate set for the neighboring BS or an active set for the neighboring BS, and applying the determined exchange channel as an operating channel.

6. A channel exchange method of a channel exchange accepting Base Station (BS) that receives a channel exchange request from a neighboring BS in a Cognitive Radio (CR) based communication system, the method comprising:
   sending a channel advertisement message to a neighboring BS;
   receiving a channel exchange request message from the neighboring BS when the neighboring BS detects a primary user in the neighboring BS using a first channel in an active set of channels for the neighboring BS, wherein the active set of channels comprises one or more channels actively used by the neighboring BS, and wherein a candidate set of channels for the neighboring BS comprises one or more channels reserved for use by the neighboring BS when one of the channels in the active set becomes unavailable;
   sending a channel exchange response message to the neighboring BS in response to the channel exchange request message, the channel exchange response message comprising at least one of the neighboring BS Identifier (ID), an ID of the channel exchange accepting BS, channel information for the channel exchange, and exchange target channel information of the neighboring BS; and
   receiving a channel exchange reply message based on the channel exchange response message from the neighboring BS,
   wherein when the channel exchange reply message indicates the neighboring BS is executing a channel exchange process, the neighboring BS moves the first channel from the active set to an inactive set of channels for the neighboring BS, switches a third channel from the candidate set to the active set, and adds a second channel identified by the channel information for the channel exchange to the candidate set.

7. The channel exchange method of claim 6, wherein the channel advertisement message comprises information relating to at least one of an active set for the channel exchange accepting BS, a candidate set for the channel exchange accepting BS, and an inactive set for the channel exchange accepting BS.

8. The channel exchange method of claim 6, wherein the channel exchange request message comprises at least one of the neighboring BS ID, the channel exchange accepting BS ID, channel information to exchange at the neighboring BS, and channel information to exchange at the channel exchange accepting BS.

9. The channel exchange method of claim 6, further comprising:
   after receiving the channel exchange reply message, sending a channel acknowledgement message, which comprises information relating to success or failure of the channel exchange process, to the neighboring BS.

10. The channel exchange method of claim 6, wherein the channel exchange process comprises at least one of determining a channel to exchange, classifying the channel to exchange into a candidate set for the channel exchange accepting BS or an active set for the channel exchange accepting BS, and applying the determined exchange channel as an operating channel.

11. A requesting Base Station (BS) that requests a neighboring BS to exchange a channel in a Cognitive Radio (CR) based communication system, the requesting BS comprising:
   a receiver configured to receive a channel advertisement message from a neighboring BS and receive a channel exchange response message from the neighboring BS in response to a channel exchange request message sent to the neighboring BS, wherein the channel exchange request message is sent when a primary user is detected in the requesting BS using a first channel in an active set of channels for the requesting BS, wherein the active set of channels comprises one or more channels actively used by the requesting BS, and wherein a candidate set of channels for the requesting BS comprises one or more channels reserved for use by the requesting BS when one of the channels in the active set becomes unavailable; and
   a transmitter configured to send the channel exchange request message to the neighboring BS, determine whether to execute a channel exchange process to the neighboring BS based on information in the channel exchange response message received from the neighboring BS, and send a channel exchange reply message indicative of the determination result,
   wherein the channel exchange request message comprises at least one of: a neighbor BS Identifier (ID); an ID of the requesting BS; channel information for the channel exchange at the requesting BS; and channel information exchangeable at the neighboring BS, and
   wherein when the channel exchange process is to be executed, the first channel is moved from the active set to an inactive set of channels for the requesting BS, a third channel is switched from the candidate set to the active set, and a second channel identified by the channel information exchangeable at the neighboring BS is added to the candidate set.

12. The requesting BS of claim 11, wherein the channel advertisement message comprises information relating to at least one of an active set for the neighboring BS, a candidate set for the neighboring BS, and an inactive set for the neighboring BS.

13. The requesting BS of claim 11, wherein the channel exchange response message comprises at least one of the neighboring BS ID, the requesting BS ID, channel information to exchange at the neighboring BS, and channel information to exchange at the requesting BS.

14. The requesting BS of claim 11, wherein, after the channel exchange reply message is transmitted, the receiver is configured to receive a channel acknowledgement message that includes information relating to success or failure of the channel exchange process from the neighboring BS.

15. The requesting BS of claim 11, wherein the channel exchange process comprises at least one of: determining a channel to exchange at the neighboring BS;
   classifying the channel to exchange at the neighboring BS to a candidate set for the neighboring BS or an active set for the neighboring BS; and applying the determined exchange channel as an operating channel.

16. A channel exchange accepting Base Station (BS) that receives a channel exchange request from a neighboring BS in a Cognitive Radio (CR) based communication system, the channel exchange accepting BS comprising:
   a transmitter configured to send a channel advertisement message to a neighboring BS and send a channel exchange response message to the neighboring BS in response to a channel exchange request message received from the neighboring BS when the neighboring BS detects a primary user in the neighboring BS using a first channel in an active set of channels for the neighboring BS, wherein the active set of channels comprises one or more channels actively used by the neighboring BS, and wherein a candidate set of channels for the neighboring BS comprises one or more channels reserved for use by the neighboring BS when one of the channels in the active set becomes unavailable; and
   a receiver configured to receive the channel exchange request message from the neighboring BS and receive a channel exchange reply message based on the channel exchange response message from the neighboring BS,
   wherein the channel exchange response message comprises at least one of: a neighboring BS Identifier (ID); an ID of the channel exchange accepting BS; channel information for the channel exchange; and exchange target channel information of the neighboring BS, and
   wherein when a channel exchange process is to be executed, the first channel is moved from the active set to an inactive set of channels for the neighboring BS a third channel is switched from the candidate set to the active set, and a second channel identified by the channel information for the channel exchange is added to the candidate set of channels by the neighboring BS.

17. The channel exchange accepting BS of claim 16, wherein the channel advertisement message comprises information relating to at least one of: an active set for the channel exchange accepting BS; a candidate set for the channel exchange accepting BS; and an inactive set for the channel exchange accepting BS.

18. The channel exchange accepting BS of claim 16, wherein the channel exchange request message comprises at least one of: the neighboring BS ID; the channel exchange accepting BS ID; channel information to exchange at the neighboring BS; and channel information exchangeable at the channel exchange accepting BS.

19. The channel exchange accepting BS of claim 16, wherein, after the channel exchange reply message is received, the transmitter is configured to send a channel acknowledgement message, which comprises information relating to success or failure of the channel exchange process, to the neighboring BS.

20. The channel exchange accepting BS of claim 16, wherein the channel exchange process comprises at least one of: determining a channel to exchange; classifying the channel to exchange into a candidate set for the channel exchange accepting BS or an active set for the channel exchange accepting BS; and applying the determined exchange channel as an operating channel.

21. A channel exchange method, comprising:
   defining an active set of channels for a requesting base station (BS), wherein the active set of channels comprises one or more channels actively used by the requesting BS;
   defining a candidate set of channels for the requesting BS, wherein the candidate set of channels comprises one or more channels reserved for use b the requesting BS when one of the channels in the active set becomes unavailable;
   detecting a primary user in the requesting BS, wherein the primary user is using a first channel; and
   when the first channel is in the active set of channels for the requesting BS, exchanging the first channel for a second channel with a neighboring BS, wherein exchanging the first channel for the second channel comprises moving the first channel from the active set to an inactive set of channels for the requesting BS, switching a third channel from the candidate set to the active set, and adding the second channel to the candidate set.

22. The method of claim 21, wherein exchanging the first channel for the second channel further comprises sending a channel exchange request message to the neighboring BS, the channel exchange request message comprising at least one of a neighbor BS Identifier (ID), a requesting BS ID, channel information for the channel exchange at the requesting BS, and channel information exchangeable at the neighboring BS.

23. The method of claim 21, wherein the inactive set of channels comprises one or more channels used by one or more primary users, and wherein exchanging the first channel for the second channel further comprises removing the first channel from the inactive set.

24. The method of claim 21,
wherein the inactive set of channels comprises one or more channels used by one or more primary users,
wherein exchanging the first channel for the second channel further comprises exchanging the first channel for a fourth channel, and
wherein exchanging the first channel for the fourth channel comprises:
adding the fourth channel to the candidate set; and
removing the first channel from the inactive set.

25. The method of claim 21, wherein the first channel is added to a candidate set of channels for the neighboring BS.

26. The method of claim 21, further comprising:
detecting an additional primary user in the requesting BS using a fourth channel; and
when the first channel is in the active set and the fourth channel is in the candidate set, (i) moving the fourth channel to the inactive set of channels, wherein the inactive set of channels comprises one or more channels used by one or more primary users, and (ii) exchanging the fourth channel for a fifth channel with the neighboring BS by adding the fifth channel to the active set, and removing the fourth channel from the inactive set, wherein the first channel and the fourth channel are added to a candidate set of channels for the neighboring BS.

* * * * *